US012277882B1

(12) United States Patent
Zhou et al.

(10) Patent No.: US 12,277,882 B1
(45) Date of Patent: Apr. 15, 2025

(54) GATE DRIVING CIRCUIT FOR GENERATING SIGNALS OF CONTROLLING SUBPIXELS OF DISPLAY PANEL, AND DISPLAY PANEL

(71) Applicant: Shenzhen China Star Optoelectronics Semiconductor Display Technology Co., Ltd., Guangdong (CN)

(72) Inventors: Xiang Zhou, Guangdong (CN); Baixiang Han, Guangdong (CN); Guangyao Li, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/401,563

(22) Filed: Dec. 31, 2023

(51) Int. Cl.
*G09G 3/20* (2006.01)

(52) U.S. Cl.
CPC ....... *G09G 3/20* (2013.01); *G09G 2310/0267* (2013.01); *G09G 2310/0286* (2013.01)

(58) Field of Classification Search
CPC ............. G09G 3/20; G09G 2310/0267; G09G 2310/0286
See application file for complete search history.

(56) References Cited

U.S. PATENT DOCUMENTS

| | | | | |
|---|---|---|---|---|
| 2017/0309240 | A1* | 10/2017 | Zhang | G11C 19/28 |
| 2018/0190181 | A1* | 7/2018 | Zhao | G09G 3/2096 |
| 2021/0335177 | A1* | 10/2021 | Feng | G11C 19/28 |

* cited by examiner

*Primary Examiner* — Adam J Snyder
(74) *Attorney, Agent, or Firm* — PV IP PC; Wei Te Chung

(57) ABSTRACT

A gate driving circuit includes gate driving units. Each of the gate driving units includes a node voltage control module and a pull-down module. The node voltage control module includes a first module and a storage module. The first module outputs a first voltage signal at a first node in response to a pull-down control signal at a first control port. The storage module includes a first port receiving the first voltage signal, and a second terminal electrically connected to the first node. The pull-down module outputs a first working signal for controlling a plurality of sub-pixels to turn off at an output port of the gate driving unit in response to the first voltage signal. The storage module maintains the first voltage signal applied on the first node to maintain the first working signal at the output port of the gate driving unit controlled by the pull-down module.

12 Claims, 3 Drawing Sheets

GATE DRIVING CIRCUIT FOR GENERATING SIGNALS OF CONTROLLING SUBPIXELS OF DISPLAY PANEL, AND DISPLAY PANEL

CROSS REFERENCE TO RELATED APPLICATION

This application claims priority to Chinese Application No. 202311390415.X, filed on Oct. 25, 2023. The entire disclosure of the above application is incorporated herein by reference.

FIELD OF INVENTION

The present disclosure relates to a field of display technology, in particular to the field of display panel manufacturing technology, specifically to a gate driving circuit and a display panel.

BACKGROUND

Gate driver on Array (GOA) technology is widely used because it is conducive to the design of narrow bezels of display screens.

However, in order to realize the function of multiple stages and to improve the leakage, many electronic elements are used in the existing GOA circuit of each stage, resulting in the high complexity and large size of the GOA circuit, so that the bezel of the display panel can not be further reduced.

Therefore, the existing GOA circuit has high complexity and large size, and needs to be improved.

SUMMARY

The embodiment of the present disclosure provides a gate driving circuit and a display panel to solve the problem that many electronic devices are used in the existing GOA circuit of each stage, which is not conducive to reducing the frame of the display panel.

According to one embodiment of the present disclosure, a gate driving circuit applied to a display panel that comprises a plurality of subpixels is provided. The gate driving circuit includes a plurality of gate driving units. Each of the plurality of gate driving units includes a node voltage control module and a pull-down module. The node voltage control module includes a first module and a storage module. The first module is used to output a first voltage signal at a first node in response to a pull-down control signal at a first control port of the first module. The storage module includes a first port receiving the first voltage signal that is constant, and a second terminal electrically connected to the first node. The pull-down module is electrically connected to the node voltage control module at the first node, and is configured to, in response to the first voltage signal, output a first working signal for controlling a plurality of sub-pixels to turn off at an output port of the gate driving unit. The storage module is configured to maintain the first voltage signal applied on the first node to maintain the first working signal at the output port of the gate driving unit controlled by the pull-down module.

Optionally, the first module further comprises a first input port and a first transistor that includes a source coupled to the first input port and the first port of the storage module to receive the first voltage signal, a gate coupled to the first control port to receive the pull-down control signal, and a drain coupled to the second terminal of the storage module and the first node to transmit the first voltage signal to the first node in response to the pull-down control signal.

Optionally, the node voltage control module further includes a second module which comprises a second input port to receive a second voltage signal and a second control port to receive a pull-up control signal. The second module is configured to output the second voltage signal to the first node in response to the pull-up control signal. The pull-down module is configured to control the gate driving unit outputting a second working signal for controlling the plurality of subpixels to turn on in response to the second voltage signal.

Optionally, the gate driving unit further includes an inverter and a pull-up module. The inverter is electrically connected to the node voltage control module through the first node, and is configured to output a third voltage signal to a second node. The pull-up module is electrically connected to the inverter through the second node, and is configured to control the gate driving unit outputting the second working signal for controlling the plurality of subpixels to turn on in response to a third voltage signal.

Optionally, the inverter is further configured to control the pull-up module to output the first working signal to an output port of the gate driving unit in response to the first voltage signal.

Optionally, the inverter comprises a first inverting transistor, a second inverting transistor and a third inverting transistor. The first inverting transistor includes comprising a gate electrically connected to the first node, a source fed with a fourth voltage signal, and a drain. The second inverting transistor includes a gate fed with third voltage signal, a source fed with third voltage signal, and a drain electrically connected to the drain of the first inverting transistor. The third inverting transistor includes a gate electrically connected to the drain of the second inverting transistor, a source fed with the third voltage signal, and the gate of the third inverting transistor, and a drain electrically connected to the second node. The first inverting transistor is configured to turn on or turn off the third inverting transistor to control voltage applied on the second node in response to voltage applied on the first node.

Optionally, the node voltage control module further comprises a pull-up control module that includes a third input port fed with a fifth voltage signal and a third control port fed with a pull-up control signal. The pull-up control module is configured to output the fifth voltage signal to the second node in response to the pull-up control signal. The gate driving unit further comprises a pull-up module that is electrically connected to the pull-up control module through the second node, and is configured to control the gate driving unit outputting the second working signal for turning on the plurality of subpixels in response to the fifth voltage signal.

Optionally, the pull-down module comprises a first pull-down transistor, a second pull-down transistor, and a third pull-down transistor. The first pull-down transistor includes a gate coupled to the first node, a source fed with a sixth voltage signal, and a drain coupled to the second node. The second pull-down transistor includes a gate coupled to the first node, a source fed with a sixth voltage signal, and a drain coupled to the output port of the gate driving unit. The third pull-down transistor includes a gate coupled to the first node, a source fed with a sixth voltage signal, and a drain coupled to another gate driving unit. The first pull-down transistor is configured to, in response to the first voltage signal, transmit the sixth voltage signal to the second node, for controlling the gate driving unit outputting the first working signal through the pull-up module to turn off the plurality of subpixels. The second pull-down transistor is configured to, in response to the first voltage signal, transmit the sixth voltage signal to the output port of the gate driving unit to turn off the plurality of sub-pixels. The third pull-down transistor is configured to, in response to the first voltage signal, transmit the sixth voltage signal to the another gate driving unit.

Optionally, the pull-up module comprises a first pull-up transistor and a second pull-up transistor. The first pull-up transistor includes a gate coupled to the second node, a source fed with a first clock signal, and a drain coupled to the output port of the gate driving unit. The second pull-up transistor includes a gate coupled to the second node, a source fed with a second clock signal, and a drain coupled to the another gate driving unit. The first pull-up transistor is configured to transmit the first clock signal to the output port of the gate driving unit as the second working signal when the third voltage signal is transmitted to the second node. The second pull-up transistor is configured to transmit the second clock signal to the another gate driving unit when the third voltage signal is transmitted to the second node.

Another embodiment of the present disclosure is directed to a display panel, which comprises a gate driving circuit and a plurality of subpixels. The gate driving circuit includes a plurality of gate driving units. Each of the plurality of gate driving units includes a node voltage control module and a pull-down module. The node voltage control module includes a first module and a storage module. The first module is used to output a first voltage signal at a first node in response to a pull-down control signal at a first control port of the first module. The storage module includes a first port receiving the first voltage signal that is constant, and a second terminal electrically connected to the first node. The pull-down module is electrically connected to the node voltage control module at the first node, and is configured to, in response to the first voltage signal, output a first working signal for controlling a plurality of sub-pixels to turn off at an output port of the gate driving unit. The storage module is configured to maintain the first voltage signal applied on the first node to maintain the first working signal at the output port of the gate driving unit controlled by the pull-down module.

Optionally, the first module further comprises a first input port and a first transistor that includes a source coupled to the first input port and the first port of the storage module to receive the first voltage signal, a gate coupled to the first control port to receive the pull-down control signal, and a drain coupled to the second terminal of the storage module and the first node to transmit the first voltage signal to the first node in response to the pull-down control signal.

Optionally, the node voltage control module further includes a second module which comprises a second input port to receive a second voltage signal and a second control port to receive a pull-up control signal. The second module is configured to output the second in voltage signal to the first node in response to the pull-up control signal. The pull-down module is configured to control the gate driving unit outputting a second working signal for controlling the plurality of subpixels to turn on in response to the second voltage signal.

Optionally, the gate driving unit further includes an inverter and a pull-up module. The inverter is electrically connected to the node voltage control module through the first node, and is configured to output a third voltage signal to a second node. The pull-up module is electrically connected to the inverter through the second node, and is configured to control the gate driving unit outputting the second working signal for controlling the plurality of subpixels to turn on in response to a third voltage signal.

Optionally, the inverter is further configured to control the pull-up module to output the first working signal to an output port of the gate driving unit in response to the first voltage signal.

Optionally, the inverter comprises a first inverting transistor, a second inverting transistor and a third inverting transistor. The first inverting transistor includes comprising a gate electrically connected to the first node, a source fed with a fourth voltage signal, and a drain. The second inverting transistor includes a gate fed with third voltage signal, a source fed with third voltage signal, and a drain electrically connected to the drain of the first inverting transistor. The third inverting transistor includes a gate electrically connected to the drain of the second inverting transistor, a source fed with the third voltage signal, and the gate of the third inverting transistor, and a drain electrically connected to the second node. The first inverting transistor is configured to turn on or turn off the third inverting transistor to control voltage applied on the second node in response to voltage applied on the first node.

Optionally, the node voltage control module further comprises a pull-up control module that includes a third input port fed with a fifth voltage signal and a third control port fed with a pull-up control signal. The pull-up control module is configured to output the fifth voltage signal to the second node in response to the pull-up control signal. The gate driving unit further comprises a pull-up module that is electrically connected to the pull-up control module through the second node, and is configured to control the gate driving unit outputting the second working signal for turning on the plurality of subpixels in response to the fifth voltage signal.

Optionally, the pull-down module comprises a first pull-down transistor, a second pull-down transistor, and a third pull-down transistor. The first pull-down transistor includes a gate coupled to the first node, a source fed with a sixth voltage signal, and a drain coupled to the second node. The second pull-down transistor includes a gate coupled to the first node, a source fed with a sixth voltage signal, and a drain coupled to the output port of the gate driving unit. The third pull-down transistor includes a gate coupled to the first node, a source fed with a sixth voltage signal, and a drain coupled to another gate driving unit. The first pull-down transistor is configured to, in response to the first voltage signal, transmit the sixth voltage signal to the second node, for controlling the gate driving unit outputting the first working signal through the pull-up module to turn off the plurality of subpixels. The second pull-down transistor is configured to, in response to the first voltage signal, transmit the sixth voltage signal to the output port of the gate driving unit to turn off the plurality of sub-pixels. The third pull-down transistor is configured to, in response to the first voltage signal, transmit the sixth voltage signal to the another gate driving unit.

Optionally, the pull-up module comprises a first pull-up transistor and a second pull-up transistor. The first pull-up transistor includes a gate coupled to the second node, a source fed with a first clock signal, and a drain coupled to the output port of the gate driving unit. The second pull-up transistor includes a gate coupled to the second node, a source fed with a second clock signal, and a drain coupled to the another gate driving unit. The first pull-up transistor is configured to transmit the first clock signal to the output port of the gate driving unit as the second working signal when the third voltage signal is transmitted to the second node. The second pull-up transistor is configured to transmit the second clock signal to the another gate driving unit when the third voltage signal is transmitted to the second node.

The present disclosure provides a gate driving circuit and a display panel. The node voltage control module is electrically connected to the first node and includes the first module and the storage module. The first control port of the first module is fed with a pull-down control signal which is used for controlling the first node to load a first voltage signal to control the pull-down module to output a first working signal to the output port of the gate driving unit to turn off the plurality of subpixels. The first capacitor is used for maintaining the first node as a first voltage signal to maintain the first pulling down module to output the first working signal. This eliminates the need for a separate pull-down maintaining module and saves the components in the gate driving unit, which reduces the bezel of the display panel.

BRIEF DESCRIPTION OF DRAWINGS

In order to more clearly illustrate the technical solution in the embodiment of the present disclosure, the following will be a brief introduction to the drawings required in the description of the embodiment. Obviously, the drawings described below are only some embodiments of the present disclosure, for those skilled in the art, without the premise of creative labor, may also obtain other drawings according to these drawings.

DETAILED DESCRIPTION OF THE EMBODIMENTS

To help a person skilled in the art better understand the solutions of the present disclosure, the following clearly and completely describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure. The term “first”, “second” are for illustrative purposes only and are not to be construed as indicating or imposing a relative importance or implicitly indicating the number of technical features indicated. Thus, a feature that limited by “first”, “second” may expressly or implicitly include at least one of the features. In the description of the present disclosure, the meaning of “plural” is two or more, unless otherwise specifically defined.

An embodiment of the present disclosure provides a gate driving circuit including but not limited to the following embodiments and a combination of the following embodiments.

Figure 1:
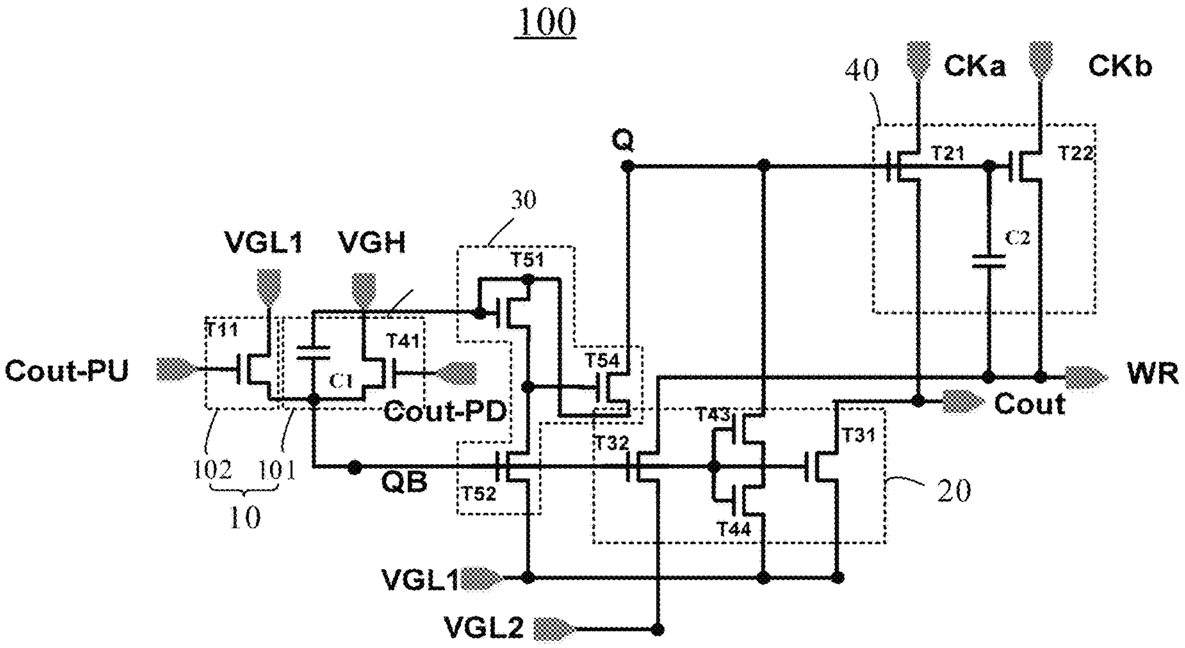
FIG. 1 is a circuit diagram of a gate driving unit according to an embodiment of the present disclosure.
Figure 2:
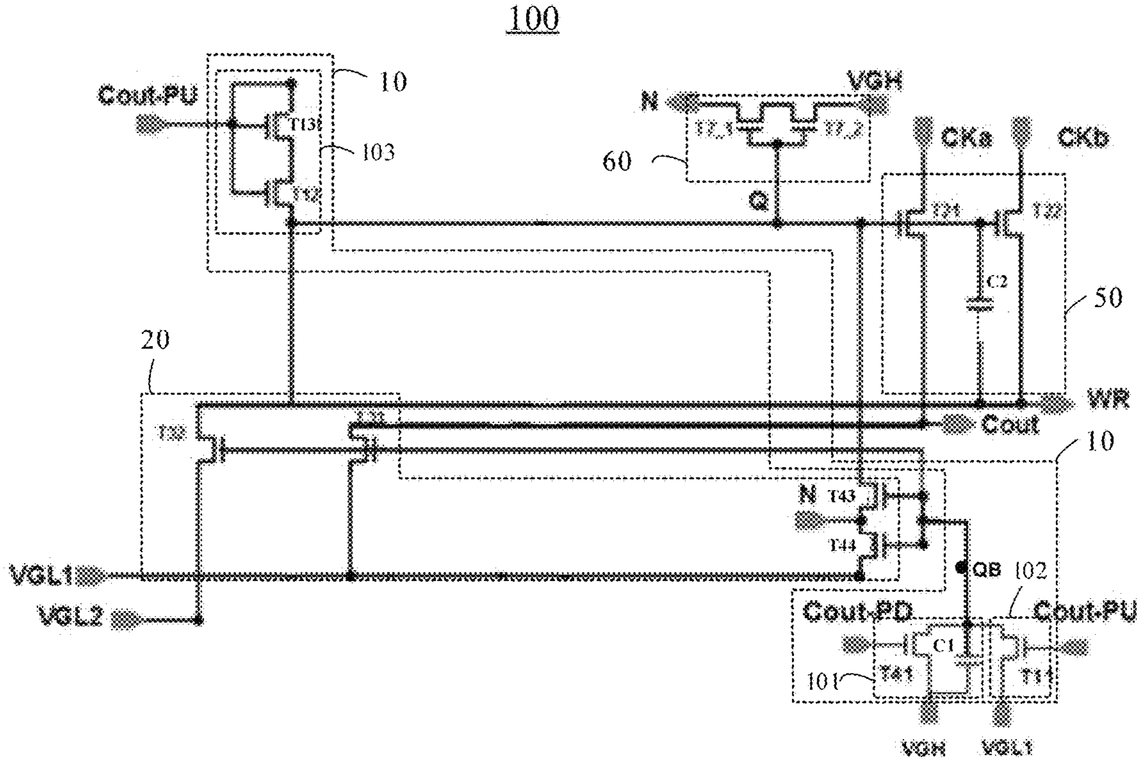
FIG. 2 is circuit diagram of a gate driving unit provided according to another embodiment of the present disclosure.

In an embodiment, as illustrated in FIG. 1 and FIG. 2, the gate driving circuit is applied to a display panel that comprises a plurality of subpixels. The gate driving circuit comprises a plurality of gate driving units 100 arranged in multi-stages. Each of the gate driving units 100 includes a node voltage control module 10 and a pull-down module 20. The node voltage control module 10 comprises a first module 101 and a storage module (for example, a first capacitor C1). The first module 101 comprises a first control port for receiving the pull-down control signal Cout-PD. The first terminal of the first capacitor C1 (i.e., the storage module) is fed with the first voltage signal VGH, the second terminal of the first capacitor C1 is electrically connected to the first node QB. The pull-down module 20 is electrically connected to the node voltage control module 10 through the first node QB. The first module 101 outputs a first voltage signal VGH at the first node QB in response to a pull-down control signal Cout-PD at a first control port of the first module. The pull-down module 20 outputs, in response to the first voltage signal VGH, a first working signal VGL2 for controlling a plurality of sub-pixels to turn off at an output port of the gate driving unit 100.

Figure 4:
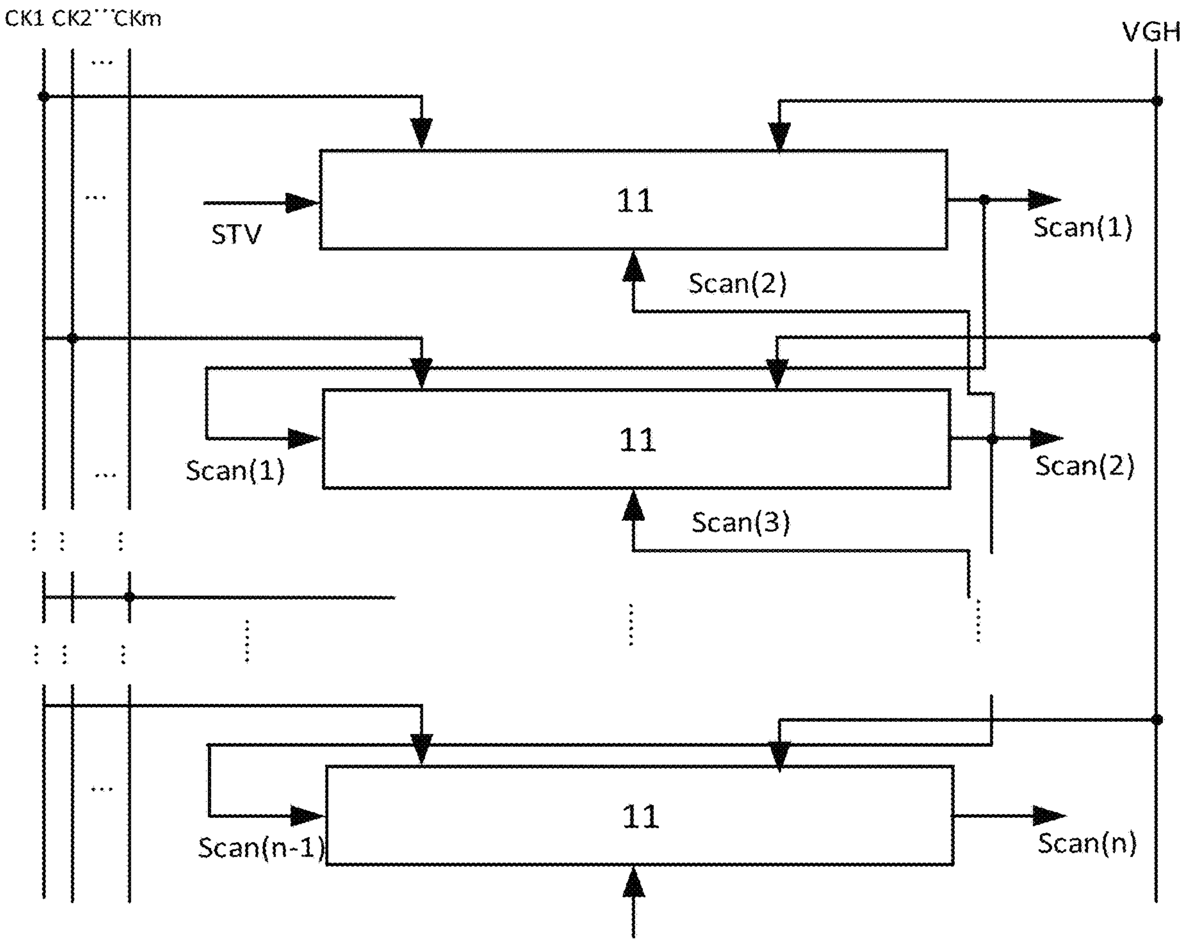
FIG. 4 is a schematic diagram of multi-stage gate driving units according to an embodiment of the present disclosure.

As illustrated in FIG. 4, the plurality of gate driving unit 100 (taking the n-stage as an example) are cascaded. Each stage gate driving unit 100 can be fed with at least one corresponding voltage signal. The voltage signal is used for controlling the operation of the gate driving unit 100. The magnitude of each voltage signal is constant, and the magnitude of different voltage signals can be different. For example, the first voltage signal VGH can be the voltage signal. Each gate driving unit 100 can be fed with one of the m clock signals CK1, CK2, . . . to CKm. For example, each clock signal can be fed to one of the plurality of gate driving units 100, then each gate driving unit 100 can be fed with one of the clock signals (any one of CK1, CK2, . . . to CKm). Each gate driving unit 100 can output a corresponding gate signal Scan(1) to Scan(n) at output port WR according to clock signal and at least one voltage signal. The first-stage gate driving unit 100 may be fed with the start signal STV and the gate signal Scan(2) generated by the output port WR of the second stage of the gate driving 100 to output the corresponding gate signal Scan(1). The intermediate gate driving unit 100 (e.g. the second stage gate driving unit 100) can be electrically connected to the output port WR of at least one previous stage of the gate driving unit 100 (here the first stage is taken as an example) to load the gate signal Scan(1), and can also be electrically connected to the output port WR of one of the next stage of the gate driving units 100 (here the third stage is taken as an example) to load the gate signal Scan(3) to output the corresponding gate signal Scan(2). Similarly, the last stage of the gate driving unit 100 (i.e., the nth stage) can be electrically connected to the output port WR of at least one previous stage of the gate driving unit 100 (e.g. the (n−1)th stage gate driving unit 100) to load the gate signal Scan(n−1), and electrically connected to the output port of at least one dummy gate driving 100 (not shown in FIG. 4) to output the corresponding gate signal Scan(n). The output signal from the dummy gate driving 100 is not used to drive subpixel luminescence.

Each gate signal includes a corresponding gate effective pulse. The magnitude of the gate effective pulse can be greater than or less than the other magnitude in the gate signal. The gate effective pulses can be used to drive the corresponding sub-pixel to emit light. Subsequent gate effective pulses can used to drive the corresponding sub-pixel to maintain luminescence. In this embodiment, for the convenience of description, it can be described based on the fact that the magnitude of the gate effective pulse is greater than the other magnitude in the gate signal, that is, the first working signal VGL2 can be regarded as less than the magnitude of the gate effective pulse. Accordingly, it is considered to be the magnitude corresponding to the non-gate effective pulse, and used to control the corresponding plurality of subpixels to turn off.

It can be understood that the node voltage control module 10 arranged by the gate driving unit 100 in this embodiment has two functions. First, the pull-down control signal Cout-PD is set to control the first node QB to be fed with the first voltage signal VGH in the corresponding time period, such as the pull-down period. The first voltage signal VGH can be fed at the first terminal of the first capacitor C1. The pull-down module 20 is controlled so that the gate driving unit 100 outputs the first working signal VGL2 at the output port WR. The magnitude of the first working signal VGL2 can equal to the magnitude of the non-gate effective pulse included in the gate signal output at the output port WR of the gate driving unit 100, so as to avoid mischarging data voltage corresponding to other subpixels due to continuously on state of the corresponding subpixel. Secondly, the first capacitor C1 is arranged to maintain the first node QB as the first voltage signal VGH. The first node QB is fed with the first voltage signal VGH. Even if the pull-down signal Cout-PD is not fed with the first voltage signal VGH, the first node QB can also be maintained as the first voltage signal VGH through the first capacitor C1, so that the pull-down module 20 keeps outputting the first working signal VGL2 to maintain the magnitude corresponding to the gate effective pulse (i.e., non-gate effective pulse) at the output port WR of the gate driving unit 100, so as to avoid the abnormality of the gate signal caused by external influence or internal leakage.

It should be noted that the node voltage control module 10 in this embodiment can not only control the output port WR of the gate driving unit 100 to output the first working signal VGL2, but also can output the first working signal VGL2 at the output port WR of the gate driving unit 100 by setting the first capacitor C1 to maintain the first working signal VGL2 at the output port of the gate driving unit 100. In contrast to the related art that a pull-down maintaining module different from the pull-down module is used to maintain the first working signal VGL2 at the output port WR of the gate driving unit 100, the present disclosure provides the node voltage control module 10 to maintain the first working signal VGL2 at the output port WR of the gate driving unit 100, which can save the number of components in the gate driving circuit and help reduce the bezel of the display panel.

In an embodiment, as illustrated in FIG. 1 and FIG. 2, the first module 101 further comprises a first input port. The first module 101 comprises a first transistor T41. A source of the first transistor T41 and the first terminal of the first capacitor C1 (i.e., the storage module) are connected to the first input port to receive the first voltage signal VGH. A gate of the first transistor T41 is electrically connected to the first control port to receive the pull-down control signal Cout-PD. A drain of the first transistor T41 and the second terminal of the first capacitor C1 (i.e., the storage module) are connected to the first node QB, so that the first transistor T41 transmits the first voltage signal VGH to the first node QB in response to the pull-down control signal Cout-PD. The first output port of the first module 101 is electrically connected to the first node QB.

Specifically, the pull-down control signal Cout-PD can control the first transistor T41 to turn on, so that the first voltage signal VGH is transmitted to the first node QB through the first transistor T41. When the first transistor T41 is turned off, the first terminal of the first capacitor C1 is fed with the first voltage signal VGH all the time, and the first node QB can also be maintained as the first voltage signal VGH to maintain the output port WR of the gate driving unit 100 outputting the first working signal VGL2.

In an embodiment, as illustrated in FIG. 1 and FIG. 2, the node voltage control module 10 further comprises a second module 102 that comprises a second input port and a second control port. The second control port is used for loading the pull-up control signal Cout-PU, and the second input port is used for loading the second voltage signal VGL1. The second module 102 outputs the second voltage signal VGL1 to the first node QB in response to the pull-up control signal Cout-PU. The pull-down module 20 is also configured to control the gate driving unit outputting a second working signal VGL1 for controlling the plurality of subpixels to turn on in response to the second voltage signal. The pull-down module 20 does not output the first working signal VGL2, but maintains the output of the second working signal (may be equal to the first voltage signal VGH) for controlling the plurality of subpixels to turn on.

Specifically, the second module 102 may include but not limited to a second transistor T11. A gate, a source and a drain of the second transistor T11 can be electrically connected to the second control port, the second input port, and the first node QB respectively. The pull-up control signal Cout-PU can control the second transistor T11 to be turned on so that the second voltage signal VGL1 is transmitted to the first node QB through the second transistor T11.

It can be understood that in this embodiment, the second module 102 in the node voltage control module 10 can control the second voltage signal VGL1 to be transmitted to the first node QB, so as to close the pull-down module 20. The pull-down module 20 does not output the first working signal VGL2, so as to at least avoid the output port WR of the gate driving unit 100 outputting voltage other than the gate effective pulse (i.e., the non-gate effective pulse). The pull-down module 20 together with other modules outputs gate effective pulse at the output port WR of the gate driving unit 100, so as to realize the driving of the corresponding sub-pixel. The output port WR of the gate driving unit 100 outputs a second working signal (which can be equal to the first voltage signal VGH) at this time can be regarded as equal to the magnitude of the gate effective pulse.

Further, the gate driving unit 100 may include, but is not limited to, the following two embodiments.

Embodiment 1

As illustrated in FIG. 1, the gate driving unit 100 further comprises an inverter 30 and a pull-up module 40. The inverter 30 is electrically connected to the node voltage control module 10 through the first node QB, and the pull-up module 40 is electrically connected to the inverter 30 through the second node Q. The inverter 30 is configured to output a third voltage signal (which can be equal to the first voltage signal VGH) to a second node Q. The pull-up module 40 is configured to control the gate driving unit outputting the second working signal (which may be equal to the first voltage signal VGH) for controlling the plurality of subpixels to turn on in response to a third voltage signal.

The inverter 30 can generate and transmit voltage applied on the second node Q based on the voltage applied on the first node QB. For example, when the second voltage signal VGL with a smaller magnitude is transmitted to the first node QB, the third voltage signal with larger magnitude can be transmitted to the second node Q (can be equal to the first voltage signal VGH). The pull-up module 40 can be controlled to output a second working signal different from the first working signal VGL2 at this moment (can be equal to the first voltage signal VGH), that is, the output of an effective gate pulse to control the corresponding multiple sub-pixels to turn on.

In embodiment 1, as illustrated in FIG. 1, the inverter 30 controls the pull-up module 40 to output the first working signal VGL2 to the output port WR of the gate driving unit 100 in response to the first voltage signal VGH. Specifically, when the first voltage signal VGH is transmitted to the first node QB, it is also used for controlling the inverter 30 not to output the third voltage signal (which can be equal to the first voltage signal VGH) to control the pull-up module 40 not to output the second working signal (which can be equal to the first voltage signal VGH) to the output port WR of the gate driving unit 100. It can be seen that when the first voltage signal VGH is transmitted to the first node QB, the pull-down module 20 is controlled to output the first working signal VGL2 at the output port WR of the gate driving unit 100. Because the pull-up module 40 also has impact on outputting the corresponding voltage to the output port WR of the gate driving unit 100 according to the voltage applied on the second node Q (related to the voltage applied on the first node QB), the inverter 30 does not output the third voltage signal when the voltage applied on the first node QB is equal to the first voltage signal VGH, avoiding the pull-down module 20 affecting the first working signal VGL2 output at the output port WR of the gate driving unit 100.

In embodiment 1, as illustrated in FIG. 1, the inverter 30 comprises a first inverting transistor T52, a second inverting transistor T51, and a third inverting transistor T54. A gate of the first inverting transistor T52 is electrically connected to the first node QB, a source of the first inverting transistor T52 is fed with a fourth voltage signal (which can be equal to the second voltage signal VGL1). A drain of the second inverting transistor T51 is electrically connected to a drain of the first inverting transistor T52. A gate and a source of the second inverting transistor T51, a source of the third inverting transistor T54 are fed with third voltage signals (which can be equal to the first voltage signal VGH). The gate of the third inverting transistor T54 is electrically connected to the drain of the second inverting transistor T51, and the drain of the third inverting transistor T54 is electrically connected to the second node Q. The first inverting transistor T52 is used for turning on the third inverting transistor T54 to control the voltage of the second node Q in response to the voltage applied on the first node QB.

Specifically, in this embodiment, the gate and the source of the second inverting transistor T51 and the source of the third inverting transistor T54 are fed with a third voltage signal (which can be equal to the first voltage signal VGH). The source of the first inverting transistor T52 is fed with the second voltage signal VGL1. The gate of the third inverting transistor T54 is electrically connected to the drain of the second inverting transistor T51 and the drain of the first inverting transistor T52. The gate of the first inverting transistor T52 is coupled to the first node QB, so that the node voltage control module 10 controls the conduction of the first inverting transistor T52 by controlling the voltage of the first node QB, and then controls the voltage applied on the gate of the third inverting transistor T54 to control the conduction of the third inverting transistor T54 and the voltage of the second node Q. Therefore, the control of the pull-up module 40 is realized, and the control of the pull-down module 20 is cooperated, and the control of the gate signal output by the gate driving unit 100 is finally realized.

Example 2

As illustrated in FIG. 2, the node voltage control module 10 further comprises a pull-up control module 103 that comprises a third input port and a third control port. The third control port receives the pull-up control signal Cout-PU, and the third input port receives a fifth voltage signal which can be equal to the pull-up control signal Cout-PU. The pull-up control module 103 outputs the fifth voltage signal to the second node Q in response to the pull-up control signal Cout-PU. The gate driving unit 100 further comprises a pull-up module 50 is electrically connected to the pull-up control module 103 through the second node Q. The pull-up module 50 outputs, in response to the fifth voltage signal, the second working signal (which may be equal to the first voltage signal VGH) for controlling the corresponding plurality of subpixels to turn on.

It should be noted that, the pull-up module 40 in FIG. 1 utilizes the inverter 30 connected between the first node QB and the second node Q to regulate of the voltage applied on the second node Q. Specifically, the inverter 30 and the pull-up control signal Cout-PU are utilized to control the voltage applied on the second node Q. As illustrated in FIG. 2, in this embodiment, the voltage of the second node Q is regulated by the pull-up control module 103.

Specifically, the pull-up control module 103 comprises a first pull-up control transistor T13. A gate and a source of the first pull-up control transistor T13 are electrically connected to the third control port and the third input port of the pull-up control module 103, respectively. The first pull-up control transistor T13 turns on to transmit the fifth voltage signal (which can be equal to the pull-up control signal Cout-PU) to the second node Q in response to the pull-up control signal Cout-PU. Furthermore, the pull-up control module 103 comprises a second pull-up control transistor T12. A gate of the second pull-up control transistor T12 may be electrically connected to the gate of the first pull-up control transistor T13 to receive the pull-up control signal Cout-PU. A source of the second pull-up control transistor T12 can be electrically connected to the drain of the first pull-up control transistor T13. A drain of the second pull-up control transistor T12 can be electrically connected to the second node Q. Compared with using only one the first pull-up control transistor T13, when the first pull-up control transistor T13 is turned off, the second pull-up control transistor T12 functioning as a switch can be turned off to reduce the leakage from the third input port to the second node Q.

In embodiments 1 and 2 as illustrated in FIG. 1 and FIG. 2, the pull-down module 20 comprises a first pull-down transistor T43, a second pull-down transistor T32 and a third pull-down transistor T31. The gate of the first pull-down transistor T43, the gate of the second pull-down transistor T32 and the gate of the third pull-down transistor T31 are connected to the first node QB. The source of the first pull-down transistor T43, the source of the second pull-down transistor T32 and the source of the third pull-down transistor T31 are connected and are all fed with a sixth voltage signal which can be equal to the first working signal VGL2 or the second voltage signals VGL1. In this embodiment, the second voltage signal VGL1 is used as an example. The drain of the first pull-down transistor T43 is electrically connected to the second node Q. The first pull-down transistor T43 which is an N-type transistor transmits the sixth voltage signal to the second node Q in response to the first voltage signal VGH. The pull-up module 40/50 controls the output port WR of the gate driving unit 100 not output the second working signal (can be equal to the first voltage signal VGH). That is, the output first working signal VGL2 generated by the pull-down module 20 is maintained at the output port WR to turned off the plurality of subpixels. The drain of the second pull-down transistor T32 is electrically connected to the output port WR of the gate driving unit 100. The second pull-down transistor T32 transmits the sixth voltage signal (as the first working signal VGL2) to the output port WR of the gate driving unit 100 for turning off the plurality of subpixels in response to the first voltage signal VGH. The drain of the third pull-down transistor T31 (configured as the stage transmitting port Cout of the gate driving unit 100 of current stage) is electrically connected to the gate driving unit 100 of another stage, and the third pull-down transistor T31 transmits the sixth voltage signal (through the stage transmitting port Cout) to the gate driving unit 100 of the another stage in response to the first voltage signal VGH.

Specifically, as illustrated in FIG. 1 and FIG. 2, it can be understood that the sixth voltage signal comprises the first working signal VGL2 and the second voltage signal VGL1. A source of the second pull-down transistor T32 is fed with the first working signal VGL2. A source of the first pull-down transistor T43 and a source of the third pull-down transistor T31 are fed with the second voltage signal VGL1. Correspondingly, under the effect of the first voltage signal VGH, the drain of the second pull-down transistor T32 (which is configured as the output port WR of the gate driving unit 100) outputs the first working signal VGL2 to the gate line, the drain of the first pull-down transistor T43 transmits the second voltage signal VGL1 to the second node Q, and the drain of the third pull-down transistor T31 transmits the second voltage signal VGL1 to the gate driving unit of the another stage.

As illustrated in FIG. 1 and FIG. 2, the pull-down module 20 may further comprise a fourth pull-down transistor T44. A gate of the fourth pull-down transistor T44 is electrically connected to the gate of the first pull-down transistor T43, the source of the fourth pull-down transistor T44 can be fed with a sixth voltage signal (e.g., it can be equal to the second voltage signal VGL1), the drain of the fourth pull-down transistor T44 can be electrically connected to the source of the first pull-down transistor T43. Similarly, analogous to the first pull-up control transistor T13 in FIG. 2 as the discussion of the second pull-up control transistor T12, the fourth pull-down transistor T44 can reduce the risk of leakage between the second node Q and the port fed with the sixth voltage signal.

In embodiments 1 and 2, as illustrated in FIG. 1 and FIG. 2, the pull-up module 40/50 comprises a first pull-up transistor T22 and a second pull-up transistor T21. The gate of the first pull-up transistor T22 and the gate of the second pull-up transistor T21 are connected to the second node Q. The source of the first pull-up transistor T22 is fed with the first clock signal CKb, and the source of the second pull-up transistor T21 is fed with the second clock signal CKa). The drain of the first pull-up transistor T22 is electrically connected to the output port WR of the gate driving unit 100. The first pull-up transistor T22 transmits the first clock signal CKb to the output port WR of the gate driving unit 100 as the second working signal (which may be equal to the first voltage signal VGH), when the third voltage signal is transmitted to the second node Q. The drain of the second up-pull transistor T21 is electrically connected to the gate driving unit 100 of another stage. The second pull-up transistor T21 is transmits the second clock signal CKa to the gate driving unit 100 of another stage when the third voltage signal (which can be equal to the first voltage signal VGH) is transmitted to the second node Q.

Specifically, considering a difference between the required signals at the output port WR of the gate driving unit of the current stage and the input port of the gate driving unit of at least one of the next stages, the source of the first pull-up transistor T22 can be fed with the first clock signal CKb, and the source of the second pull-up transistor T21 can be fed with the second clock signal CKa. Based on the fact that the first pull-up transistor T22 and the second pull-up transistor T21 are both N-type transistors, because the magnitude of the third voltage signal (the first voltage signal VGH) can be a larger magnitude, the second pull-up transistor T21 and the first pull-up transistor T22 can be turned on in response to the third voltage signal, so that the second clock signal CKa is transmitted to the corresponding transmission port Cout through the second pull-up transistor T21 to the gate driving unit 100 of the another stage, and the first clock signal CKb is transmitted to the corresponding output port WR through the first pull-up transistor T22 to the corresponding gate line simultaneously.

Furthermore, as illustrated in FIG. 1 and FIG. 2, the pull-up module 40/50 may comprise a second capacitor C2 connected between the gate of the first pull-up transistor T22 and the drain of the first pull-up transistor T22. When the first pull-up transistor T22 and the second pull-up transistor T21 are both turned on (that is, the second node Q is at high voltage level), a transition of the clock signal (e.g. the rising edge) causes corresponding transitions of signal applied on the output port WR of the gate driving unit 100 and the transmission port Cout. The potential of the second node Q can be lifted by the bootstrap effect of the second capacitor C2, which is conducive to turn on the first pull-up transistor T22 and the second pull-up transistor T21.

Furthermore, as illustrated in FIG. 2, the gate driving unit 100 may further comprise a leak-proof module 60 that comprises a first leak-proof transistor T7_1 and a second leak-proof transistor T7_2 connected in series. The gate of the first leak-proof transistor T7_1 and the gate of the second leak-proof transistor T7_2 are connected to the second node Q. The source of the second leak-proof transistor T7_2 can be fed with the first voltage signal VGH. A drain of the second leak-proof transistor T7_2 can be electrically connected to the source of the first leak-proof transistor T7_1. A drain of the first leak-proof transistor T7_1 can be electrically connected to the third node N. The third node N can be electrically connected to the gate of the first pull-down transistor T43 and the gate of the fourth pull-down transistor T44 in the pull-down module 20. Based on the fact that the first leak-proof transistor T7_1 and the second leak-proof transistor T7_2 both are N-type transistors, when the first leak-proof transistor T7_1 and the second leak-proof transistor T7_2 are turned on in response to the voltage of the second node Q, the first voltage signal VGH with higher magnitude is transmitted to the third node N, so that the first leak-proof transistor T7_1 and the second leak-proof transistor T7_2 can be turned off, which reduces the risk of forming a leakage path between the second node Q and the terminal fed with the second voltage signal VGL1, thereby reducing the risk of the potential of the second node Q being pulled down.

The leak-proof module 60 is electrically connected to the second node Q as illustrated in FIG. 1. The third node N can be electrically connected to the gate of the first pull-down transistor T43 and the gate of the fourth pull-down transistor T44 in the pull-down module 20, thereby reducing the risk that the potential of the second node Q in FIG. 1 is pulled down.

Figure 3:
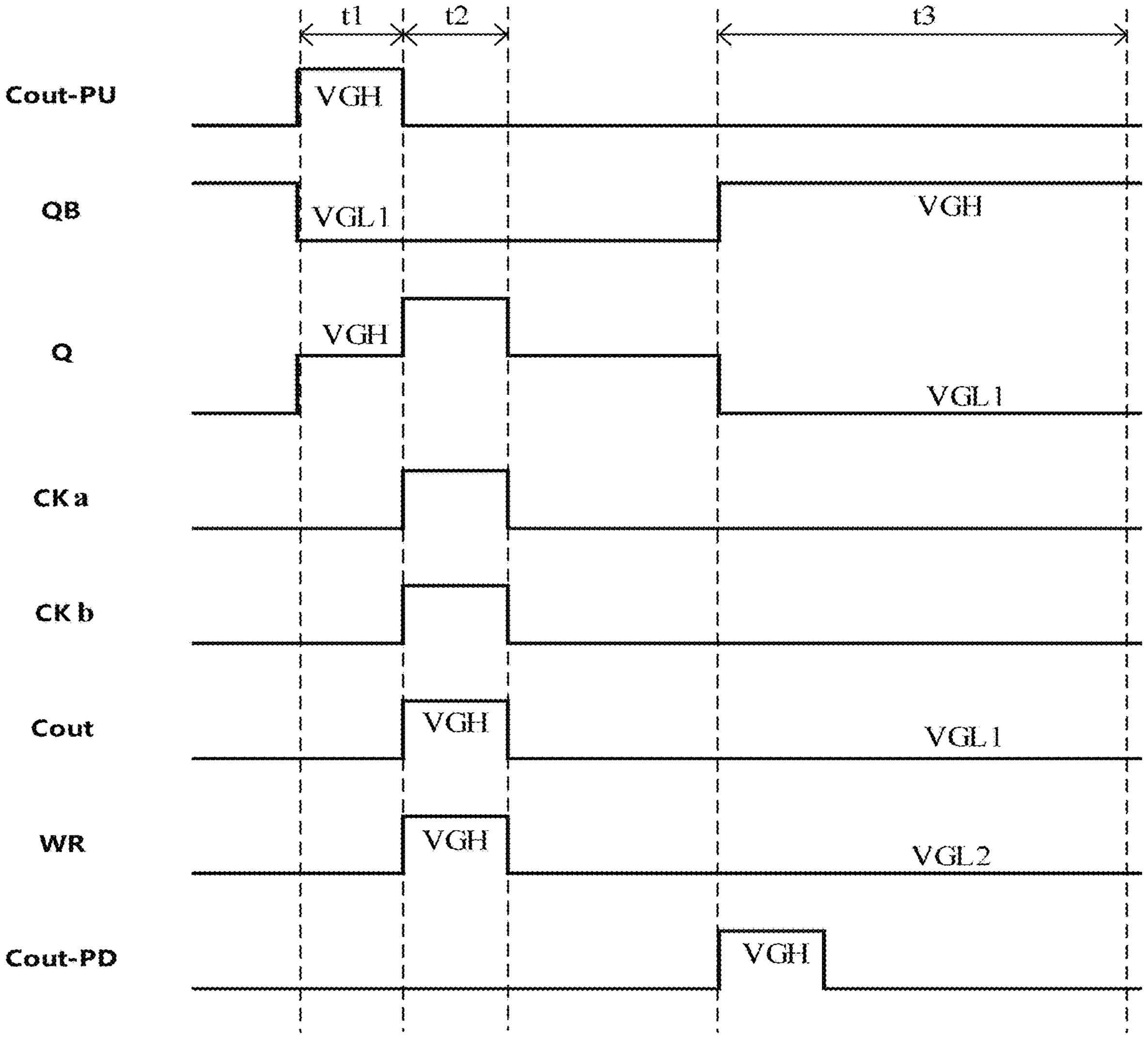
FIG. 3 is a timing diagram of signals applied in the gate driving unit according to an embodiment of the present disclosure.

Specifically, in order to facilitate the understanding of the technical scheme in the present disclosure, all transistors in FIG. 1 and FIG. 2 are N-type transistors. Referring to FIG. 3 illustrating some signals applied the circuit illustrated in FIG. 1 and FIG. 2, the working process of the gate driving circuit may include, but is not limited to, the following stages:

In the first stage t1, the pull-up control signal Cout-PU is at high potential, and the transistor T11 in the second module 102 in the node voltage control module 10 is turned on, so that the second voltage signal VGL1 with low voltage is transmitted to the first node QB through the transistor T11. On one hand, the second voltage signal VGL1 can turn off transistors T32, T31, T43 and T44 to make the transmitting port Cout not output the first working signal (equal to VGL1), so that the output port WR does not output VGL2, and the second node Q is not pulled down to VGL1. On the other hand, as illustrated in FIG. 1, the second voltage signal VGL1 can turn off the transistor T52 so that the voltage applied on the drain of the transistor T51 is equal to the VGH with higher potential to turn on the transistor T54. The first voltage signal VGH with higher potential is transmitted to the second node Q. Because the pull-up control signal Cout-PU at high potential can turn on the transistors T13, T12 in the pull-up control module 103, the pull-up control signal Cout-PU with higher potential is transmitted to the second node Q. Since the second node Q in FIG. 1 and FIG. 2 both have higher potentials (it can be considered that the high potential of the pull-up control signal Cout-PU is equal to first voltage signal VGH), the transistors T21 and T22 in the pull-up module 40 are turned on. At this time, because the clock signals CKa and CKb are at low potential, voltage applied on the transmitting port Cout and out port WR are low potential of the clock signals CKa and CKb, respectively.

The first stage t1 can be understood as the pre-charge stage of the second node Q, and the transmitting port Cout and out port WR can be regarded as maintaining the low voltage that was reset before, and the low voltage can be provided by clock signals CKa and CKb, or VGL1 and VGL2 respectively.

In the second stage t2, the pull-up control signal Cout-PU and the pull-down control signal Cout-PD are all low potentials, as illustrated in FIG. 1 and FIG. 2. The low potential of the first node QB can be maintained through the first capacitor C1 at this moment, so that the transistors in the pull-down module 20 are all turned off. As illustrated in FIG. 1, the first node QB is maintained as a low potential to turn off the transistors T52, so as to avoid the voltage change of the second node Q. As illustrated in FIG. 2, when the transistors T13, T12 in the pull-up control module 103 are turned off, voltage applied on the second node Q is maintained as the original potential and the transistors T21 and T22 in the pull-up module 40 are turned on. Because clock signals CKa and CKb both jump to the high potential, the transmitting port Cout and out port WR are at high potentials of clock signal CKa and clock signal CKb, respectively. Through the bootstrapping effect of the second capacitor C2, the voltage of the second node Q can be further raised. The raised amount equals to a difference between the high potential and the low potential of the clock signal CKa, and also equal to a difference between the high potential and the low potential of the clock signal CKb (in a condition that CKa is equal to CKb).

In the third stage t3, the pull-down control signal Cout-PD is the corresponding high potential, and the transistor T41 in the first module 101 in the node voltage control module 10 is turned on, so that the first voltage signal VGH with high voltage is transmitted to the first node QB through the transistor T41. On one hand, the first voltage signal VGH turns on transistors T32, T31, T43 and T44 to make transmitting port Cout output the first operating signal (equal to VGL1), so that the output port WR outputs VGL2, and the second node Q is pulled down to VGL1. On the other hand, as illustrated in FIG. 1, the first voltage signal VGH can turn on transistor T52 so that the voltage applied on the drain of the transistor T51 equals to the higher voltage of the first voltage signal VGH and second voltage signal VGL1 to turn off the transistor T54, thereby avoiding pulling up voltage applied on the second node Q through the transistor T54. As illustrated in FIG. 2, the pull-up control signal Cout-PU with low potential can also turn off the transistors T13 and T12 in the pull-up control module 103, so as to avoid pulling up the second node Q through the transistors T13 and T12.

It is understandable that in the period after the third stage t3, the pull-down control signal Cout-PD also becomes the corresponding low potential, as illustrated in FIG. 1 and FIG. 2. Due to the voltage stabilization of the first capacitor C1, the first node QB can still be maintained as a high-voltage VGH to maintain the low voltage of the second node Q.

In the third stage t3, when the pull-down control signal Cout-PD transitions from the high voltage to the low voltage, the low potential of the first node QB can still be hold due to the first capacitor C1, so that the second node Q is maintained to be pulled down through the pull-down module 20. In contrast to prior art, the present disclosure does not need a pull-down maintaining module to keep pulling-down voltage applied on the second node Q. In addition, because of an absence of the pull-down maintaining module, the number of wirings electrically connected to the second node Q is reduced, so that the leakage path of the second node Q as well as the risk of leakage of the second node Q is reduced, and the leakage module can also be omitted.

Another embodiment of the present disclosure is directed to a display panel comprising a gate driving circuit as described in the above embodiments.

The present disclosure provides a gate driving circuit and a display panel. The node voltage control module is electrically connected to the first node and includes the first module and the storage module. The first control port of the first module is fed with a pull-down control signal which is used for controlling the first node to load a first voltage signal to control the pull-down module to output a first working signal to the output port of the gate driving unit to turn off the plurality of subpixels. The first capacitor is used for maintaining the first node as a first voltage signal to maintain the first pulling down module to output the first working signal. This eliminates the need for a separate pull-down maintaining module and saves the components in the gate driving unit, which reduces the bezel of the display panel.

The above is a display device provided by an embodiment of the present disclosure is described in detail, and a specific example is applied herein to explain the principle and embodiment of the present disclosure, and the description of the above embodiment is only used to help understand the method of the present disclosure and its core ideas. At the same time, for those skilled in the art, according to the idea of the present disclosure, there will be changes in the specific embodiment and the scope of application, in summary, the content of this specification should not be understood as a restriction on the present disclosure.

What is claimed is:

1. A gate driving circuit, applied to a display panel that comprises a plurality of subpixels, the gate driving circuit comprising a plurality of gate driving units, each of the plurality of gate driving units comprising:

a node voltage control module, comprising:

a first module, configured to output a first voltage signal at a first node in response to a pull-down control signal at a first control port of the first module;

a storage module, comprising a first port receiving the first voltage signal that is constant, and a second terminal electrically connected to the first node; and a second module, comprising a second input port to receive a second voltage signal and a second control port to receive a pull-up control signal;

a pull-down module, electrically connected to the node voltage control module at the first node, and configured to, in response to the first voltage signal, output a first working signal for controlling a plurality of sub-pixels to turn off at an output port of the gate driving unit;

an inverter, electrically connected to the node voltage control module through the first node, configured to output a third voltage signal to a second node; and a pull-up module, electrically connected to the inverter through the second node, configured to control the gate driving unit outputting the second working signal for controlling the plurality of subpixels to turn on in response to a third voltage signal;

wherein the storage module is configured to maintain the first voltage signal applied on the first node to maintain the first working signal at the output port of the gate driving unit controlled by the pull-down module, wherein the second module is configured to output the second voltage signal to the first node in response to the pull-up control signal, wherein the pull-down module is configured to control the gate driving unit outputting a second working signal for controlling the plurality of subpixels to turn on in response to the second voltage signal, wherein the inverter comprises:

a first inverting transistor, comprising a gate electrically connected to the first node, a source fed with a fourth voltage signal, and a drain;

a second inverting transistor, comprising a gate fed with third voltage signal, a source fed with third voltage signal, and a drain electrically connected to the drain of the first inverting transistor; and a third inverting transistor, comprising a gate electrically connected to the drain of the second inverting transistor, a source fed with the third voltage signal, and the gate of the third inverting transistor, and a drain electrically connected to the second node;

wherein the first inverting transistor is configured to turn on or turn off the third inverting transistor to control voltage applied on the second node in response to voltage applied on the first node.

2. The gate driving circuit of claim 1, wherein the first module further comprises:

a first input port; and a first transistor, comprising a source coupled to the first input port and the first port of the storage module to receive the first voltage signal, a gate coupled to the first control port to receive the pull-down control signal, and a drain coupled to the second terminal of the storage module and the first node to transmit the first voltage signal to the first node in response to the pull-down control signal.

3. The gate driving circuit of claim 1, wherein the inverter is further configured to control the pull-up module to output the first working signal to an output port of the gate driving unit in response to the first voltage signal.

4. The gate driving circuit of claim 1, wherein the node voltage control module further comprises:

a pull-up control module, comprising a third input port fed with a fifth voltage signal and a third control port fed with a pull-up control signal, configured to output the fifth voltage signal to the second node in response to the pull-up control signal;

wherein the gate driving unit further comprises a pull-up module that is electrically connected to the pull-up control module through the second node, and is configured to control the gate driving unit outputting the second working signal for turning on the plurality of subpixels in response to the fifth voltage signal.

5. The gate driving circuit of claim 1, wherein the pull-down module comprises:

a first pull-down transistor, comprising a gate coupled to the first node, a source fed with a sixth voltage signal, and a drain coupled to the second node;

a second pull-down transistor, comprising a gate coupled to the first node, a source fed with a sixth voltage signal, and a drain coupled to the output port of the gate driving unit; and a third pull-down transistor, comprising a gate coupled to the first node, a source fed with a sixth voltage signal, and a drain coupled to another gate driving unit;

wherein the first pull-down transistor is configured to, in response to the first voltage signal, transmit the sixth voltage signal to the second node, for controlling the gate driving unit outputting the first working signal through the pull-up module to turn off the plurality of subpixels, wherein the second pull-down transistor is configured to, in response to the first voltage signal, transmit the sixth voltage signal to the output port of the gate driving unit to turn off the plurality of sub-pixels, wherein the third pull-down transistor is configured to, in response to the first voltage signal, transmit the sixth voltage signal to the another gate driving unit.

6. The gate driving circuit of claim 1, wherein the pull-up module comprises:

a first pull-up transistor, comprising a gate coupled to the second node, a source fed with a first clock signal, and a drain coupled to the output port of the gate driving unit; and a second pull-up transistor, comprising a gate coupled to the second node, a source fed with a second clock signal, and a drain coupled to the another gate driving unit;

wherein the first pull-up transistor is configured to transmit the first clock signal to the output port of the gate driving unit as the second working signal when the third voltage signal is transmitted to the second node, wherein the second pull-up transistor is configured to transmit the second clock signal to the another gate driving unit when the third voltage signal is transmitted to the second node.

7. A display panel, comprising:

a plurality of subpixels; and a gate driving circuit comprising a plurality of gate driving units, each of the plurality of gate driving units comprising:

a node voltage control module, comprising:

a first module, configured to output a first voltage signal at a first node in response to a pull-down control signal at a first control port of the first module;

a storage module, comprising a first port receiving the first voltage signal that is constant, and a second terminal electrically connected to the first node; and a second module, comprising a second input port to receive a second voltage signal and a second control port to receive a pull-up control signal;

a pull-down module, electrically connected to the node voltage control module at the first node, and configured to, in response to the first voltage signal, output a first working signal for controlling a plurality of sub-pixels to turn off at an output port of the gate driving unit;

an inverter, electrically connected to the node voltage control module through the first node, configured to output a third voltage signal to a second node; and a pull-up module, electrically connected to the inverter through the second node, configured to control the gate driving unit outputting the second working signal for controlling the plurality of subpixels to turn on in response to a third voltage signal;

wherein the storage module is configured to maintain the first voltage signal applied on the first node to maintain the first working signal at the output port of the gate driving unit controlled by the pull-down module, wherein the second module is configured to output the second voltage signal to the first node in response to the pull-up control signal, wherein the pull-down module is configured to control the gate driving unit outputting a second working signal for controlling the plurality of subpixels to turn on in response to the second voltage signal, wherein the inverter comprises:

a first inverting transistor, comprising a gate electrically connected to the first node, a source fed with a fourth voltage signal, and a drain;

a second inverting transistor, comprising a gate fed with third voltage signal, a source fed with third voltage signal, and a drain electrically connected to the drain of the first inverting transistor; and a third inverting transistor, comprising a gate electrically connected to the drain of the second inverting transistor, a source fed with the third voltage signal, and the gate of the third inverting transistor, and a drain electrically connected to the second node;

wherein the first inverting transistor is configured to turn on or turn off the third inverting transistor to control voltage applied on the second node in response to voltage applied on the first node.

8. The display panel of claim 7, wherein the first module further comprises:

a first input port; and a first transistor, comprising a source coupled to the first input port and the first port of the storage module to receive the first voltage signal, a gate coupled to the first control port to receive the pull-down control signal, and a drain coupled to the second terminal of the storage module and the first node to transmit the first voltage signal to the first node in response to the pull-down control signal.

9. The display panel of claim 7, wherein the inverter is further configured to control the pull-up module to output the first working signal to an output port of the gate driving unit in response to the first voltage signal.

10. The display panel of claim 7, wherein the node voltage control module further comprises:

a pull-up control module, comprising a third input port fed with a fifth voltage signal and a third control port fed with a pull-up control signal, configured to output the fifth voltage signal to the second node in response to the pull-up control signal;

wherein the gate driving unit further comprises a pull-up module that is electrically connected to the pull-up control module through the second node, and is configured to control the gate driving unit outputting the second working signal for turning on the plurality of subpixels in response to the fifth voltage signal.

11. The display panel of claim 7, wherein the pull-down module comprises:

a first pull-down transistor, comprising a gate coupled to the first node, a source fed with a sixth voltage signal, and a drain coupled to the second node;

a second pull-down transistor, comprising a gate coupled to the first node, a source fed with a sixth voltage signal, and a drain coupled to the output port of the gate driving unit; and a third pull-down transistor, comprising a gate coupled to the first node, a source fed with a sixth voltage signal, and a drain coupled to another gate driving unit;

wherein the first pull-down transistor is configured to, in response to the first voltage signal, transmit the sixth voltage signal to the second node, for controlling the gate driving unit outputting the first working signal through the pull-up module to turn off the plurality of subpixels, wherein the second pull-down transistor is configured to, in response to the first voltage signal, transmit the sixth voltage signal to the output port of the gate driving unit to turn off the plurality of sub-pixels, wherein the third pull-down transistor is configured to, in response to the first voltage signal, transmit the sixth voltage signal to the another gate driving unit.

12. The display panel of claim 7, wherein the pull-up module comprises:

a first pull-up transistor, comprising a gate coupled to the second node, a source fed with a first clock signal, and a drain coupled to the output port of the gate driving unit; and a second pull-up transistor, comprising a gate coupled to the second node, a source fed with a second clock signal, and a drain coupled to the another gate driving unit;

wherein the first pull-up transistor is configured to transmit the first clock signal to the output port of the gate driving unit as the second working signal when the third voltage signal is transmitted to the second node, wherein the second pull-up transistor is configured to transmit the second clock signal to the another gate driving unit when the third voltage signal is transmitted to the second node.

* * * * *